(12) United States Patent
Hintenlang et al.

(10) Patent No.: US 9,033,345 B2
(45) Date of Patent: May 19, 2015

(54) RADIAL SHAFT SEAL FOR SEPARATING TWO MEDIA

(75) Inventors: Guenter Hintenlang, Abtsteinach (DE); Christian Kohl, Hirschberg (DE)

(73) Assignee: CARL FREUDENBERG KG, Weinheim (DE)

( * ) Notice: Subject to any disclaimer, the term of this patent is extended or adjusted under 35 U.S.C. 154(b) by 77 days.

(21) Appl. No.: 13/031,320

(22) Filed: Feb. 21, 2011

(65) Prior Publication Data

US 2011/0204577 A1 Aug. 25, 2011

(30) Foreign Application Priority Data

Feb. 19, 2010 (EP) ..................................... 10001684

(51) Int. Cl.
*F16J 15/32* (2006.01)
*F16J 15/00* (2006.01)
*F16J 15/16* (2006.01)

(52) U.S. Cl.
CPC .............. *F16J 15/002* (2013.01); *F16J 15/164* (2013.01); *F16J 15/3232* (2013.01); *F16J 15/3268* (2013.01)

(58) Field of Classification Search
USPC ................. 277/549, 551, 552, 558, 562, 563
See application file for complete search history.

(56) References Cited

U.S. PATENT DOCUMENTS

| | | | | |
|---|---|---|---|---|
| 2,167,603 A * | 7/1939 | Victor | ............................ | 277/562 |
| 2,185,790 A * | 1/1940 | Kosatka et al. | ................ | 277/562 |
| 2,675,258 A * | 4/1954 | Dutton-Forshaw | ........... | 277/555 |
| 2,818,283 A | 12/1957 | Hutterer | | |
| 3,516,679 A | 6/1970 | Schmitt et al. | | |
| 3,575,426 A * | 4/1971 | Durham | ........................ | 277/432 |
| 3,871,666 A * | 3/1975 | Franz et al. | .................... | 277/563 |
| 3,921,987 A | 11/1975 | Johnston et al. | | |
| 4,337,956 A * | 7/1982 | Hopper | ......................... | 277/552 |
| 5,009,435 A * | 4/1991 | Villanyi et al. | ............... | 277/552 |
| 5,199,718 A * | 4/1993 | Niemiec | ....................... | 277/552 |
| 5,211,406 A * | 5/1993 | Katzensteiner | .............. | 277/351 |
| 5,503,480 A * | 4/1996 | Caillaut et al. | ................ | 384/477 |
| 5,505,480 A | 4/1996 | Pascarella | | |
| 5,692,757 A * | 12/1997 | Straub | ........................... | 277/559 |
| 5,727,794 A | 3/1998 | Fauchon | | |
| 6,520,506 B2 | 2/2003 | Reinhardt et al. | | |
| 6,561,519 B1 | 5/2003 | Frese et al. | | |
| 7,090,223 B2 * | 8/2006 | Reinhard | ...................... | 277/551 |
| 7,775,528 B2 * | 8/2010 | Berdichevsky | ................ | 277/559 |
| 7,891,670 B2 * | 2/2011 | Alajbegovic | .................. | 277/559 |
| 2004/0169339 A1 * | 9/2004 | Bock et al. | .................... | 277/549 |
| 2006/0091614 A1 * | 5/2006 | Oricchio, Jr. | ................. | 277/549 |
| 2007/0152405 A1 * | 7/2007 | Wen et al. | ..................... | 277/559 |
| 2008/0088094 A1 * | 4/2008 | Borowski et al. | ............. | 277/559 |
| 2010/0119368 A1 * | 5/2010 | Fos et al. | ........................ | 415/230 |
| 2010/0237567 A1 | 9/2010 | Kurth et al. | | |

FOREIGN PATENT DOCUMENTS

DE 2 333 208 A1 1/1974
DE 23 51 767 A1 4/1975

(Continued)

*Primary Examiner* — Kristina Fulton
*Assistant Examiner* — Eugene G Byrd
(74) *Attorney, Agent, or Firm* — Leydig, Voit & Mayer, Ltd

(57) ABSTRACT

A radial shaft seal for separating two media includes two radial shaft sealing rings each including an axial surface and a sealing lip. The sealing rings are disposed with the axial surfaces facing one another and the sealing lips axially opposed to one another with a space between the sealing lips including a vent. At least one of the sealing rings includes clamping cams configured to grip an inner rim of the other sealing ring so as to join the sealing rings in a form-locking, rear-engaging position relative to each other.

14 Claims, 2 Drawing Sheets

(56) References Cited

FOREIGN PATENT DOCUMENTS

| | | | |
|---|---|---|---|
| DE | 196 22 850 A1 | 12/1996 |
| EP | 1 388 694 A2 | 2/2004 |
| EP | 1 557 596 B1 | 12/2006 |
| GB | 1117672 A | 6/1968 |
| GB | 1476662 A | 6/1977 |
| WO | WO 2009015806 A1 | 2/2009 |

* cited by examiner

RADIAL SHAFT SEAL FOR SEPARATING TWO MEDIA

CROSS-REFERENCE TO PRIOR APPLICATIONS

Priority is claimed to claimed to European Patent Application No. EP 10 001 684.9, filed Feb. 19, 2010, the entire disclosure of which is hereby incorporated by reference herein.

FIELD

The present invention relates to a radial shaft seal for separating two media.

BACKGROUND

U.S. Pat. No. 3,516,679 describes a sealing arrangement that is composed of at least two radial shaft sealing rings and that has sealing lips extending in the same direction. However, this type of sealing arrangement allows a sealing action in only one axial direction.

U.S. Pat. No. 2,818,283 describes another possible arrangement of two radial shaft sealing rings where the sealing lips are oriented to axially oppose one another. The space formed between the two sealing lips is provided with a supply channel and is used for receiving a fluid. Since, in this case, the sealing lips are oriented away from the space to be actually sealed, such an arrangement is not suited for sealing two highly pressurized media, since, at a relatively high pressure, the sealing lips would lift off automatically from the shaft surface.

British Patent GB 1,117,672 also describes a seal combination where two axially side-by-side configured radial shaft sealing rings having oppositely directed sealing lips are used. Between the two sealing rings, a gap is formed via which it is possible to vent the space formed between the sealing lips. However, to connect two identically constructed shaft sealing rings in series, a considerable overall axial length is required, which, in many case, is not available. Moreover, the sealing rings must be assembled separately, one after another.

German Patent Application DE 192 22 850 A1 also discusses a sealing arrangement where two sealing rings of the same shape and size are joined together in one piece, positioning means being inserted between the sealing rings that retain the sealing rings in fixed relative positions, and which has connection means for joining the sealing rings together. This is a very costly design whose use only seems practical in special cases, at the very least due to the high costs.

European Patent Specification EP 1 557 596 B1 describes a very simple approach for a radial shaft seal for sealing two media, where the radial shaft sealing rings have an identical design and are able to fit into one another. In this case, on their surfaces that are directed toward one another, the radial shaft sealing rings are provided with axially oriented ring segments, which interlock by force- and/or form-locking when radial shaft sealing rings are installed. Together with the radial inner surfaces of the outer ring segments, the radial outer surfaces of the inner ring segments form a snap-fit connection. Free clearance spaces, which form a venting gap, exist between the sealing rings. In this context, the snap-fit connection is formed by a conical configuration of the outer, respectively inner surfaces.

SUMMARY

In an embodiment, the present invention provides a radial shaft seal for separating two media including two radial shaft sealing rings. Each sealing ring includes an axial surface and a sealing lip. The sealing rings are disposed with the axial surfaces facing one another and the sealing lips axially opposed to one another with a space between the sealing lips including a vent. At least one of the sealing rings includes clamping cams configured to grip an inner rim of the other sealing ring so as to join the sealing rings in a form-locking, rear-engaging position relative to each other.

BRIEF DESCRIPTION OF THE DRAWING

The present invention will be described in even greater detail below based on the exemplary figures, which are not to scale. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
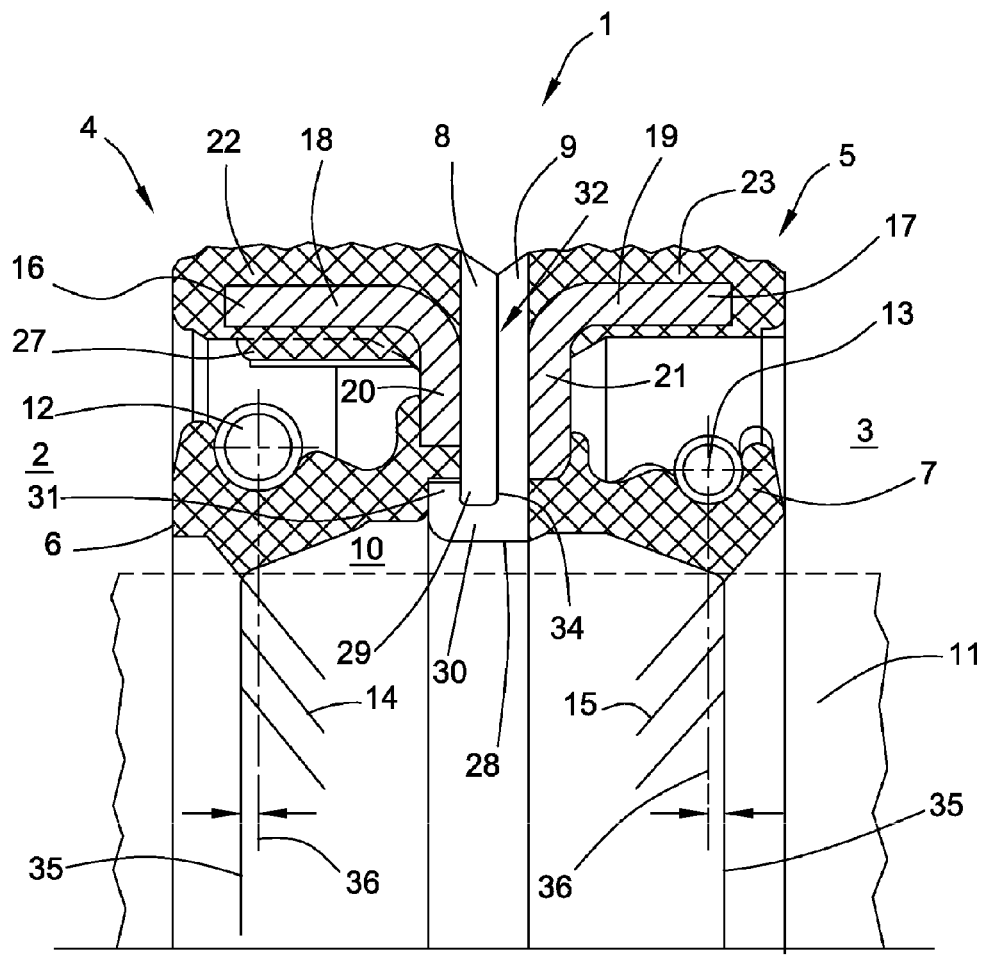
FIG. 1 is a sectional view through the radial shaft seal according to an embodiment of the present invention.

In an embodiment, the present invention provides a radial shaft seal which includes two radial shaft sealing rings that are joined to one another in form-locking engagement and that are oriented with their bottom surfaces facing one another and their sealing lips axially opposing one another, the space between the sealing lips being provided with a vent.

It is an aspect of the present invention to provide a radial shaft seal for separating two media that will be able to be used in a variety of ways, require little overall space, and provide substantial design freedom. It is advantageous that the sealing rings be joined together in a captive manner, permit high rotational speeds, and also that they be usable for changing rotational directions.

In an embodiment of the present invention, at least one of the sealing rings is provided with clamping cams, which grip via a radially inner rim of the other sealing ring, so that the two sealing rings are able to be joined together in a form-locking, rear-engaging position relative to each other. The clamping cams are made of an elastomer material to allow them to snap into place via the radially inner rim of the other sealing ring. In addition, the rim of the other sealing ring may be fabricated of an elastomer material. The inwardly directed, radially protruding rim of the one sealing ring is a part of the bottom surface of the sealing ring. Moreover, together with the contiguous portion of the sealing lip, the rim forms an annular groove into which the clamping cams of the other sealing ring snap. The clamping cams, in turn, form an annular groove with the bottom surface of the corresponding sealing ring, into which the protruding rim of the first sealing ring engages fittingly.

The clamping cams, the protruding rim and the sealing lips are preferably fabricated from the same elastomer material and integrally joined to one another.

The sealing rings, in turn, are provided with stiffening elements which are formed in an L-shape. The radially outer limb of the L has a coating layer of an elastomer material which is used for statically sealing the radial shaft seal in an opening. The sealing lips, which are preferably equipped with a helical spring, are affixed to the radial flanks of the stiffening elements of the sealing rings. The sealing lips are adapted to the pressures prevailing in the spaces to be sealed. Thus, for example, one sealing lip may be designed to be larger than the other. However, both sealing lips are provided with oppositely directed return flow grooves or with a bidirectional helix to allow the leakage fluid, which is to be introduced, to be returned from the interior space between the two sealing lips. The bottom surfaces of the sealing rings present at the radial flank surfaces of the stiffening elements that are oriented toward one another are likewise made of an elastomer material. Both bottom surfaces are utilized to form the clamping cams and the protruding rim. In other words, the bottom surface of the one sealing ring is provided with the inwardly projecting rim, while the other bottom surface of the other sealing ring has the clamping cams on its inner rim side. Moreover, the bottom surfaces have cut-outs that are radially disposed in regular intervals over the circumference thereof. in an embodiment, these cut-outs have identical cross sections. In another embodiment, the same number of cut-outs is present in the sealing rings. Specific embodiments are possible where one sealing ring has twice the number of cut-outs as the other sealing ring. Other configurations may also be implemented where the two cut-outs reach the covering at least once, thereby providing a passage to the outside, and, therefore, making it possible to vent the interior space between the two sealing lips.

The embodiment shown in FIG. 1 of a radial shaft seal 1 for separating two media present in spaces 2 and 3 essentially includes radial shaft sealing rings 4 and 5, which are joined together in form-locking engagement. Sealing lips 6 and 7 are oriented to axially oppose one another. In the installed state, bottom surfaces 8 and 9 thereof rest against each other. Space 10 formed between sealing lips 6 and 7 is provided with a vent 32 to the outside. Shaft 11 encircled by the seal is indicated by a broken line. Sealing lip 6 shown in the drawing is designed to be larger than sealing lip 7. In this variant, helical springs 12 and 13, which are used, also differ in size and are adapted accordingly. Designs are also possible where both lips are of the same size. Sealing lips 6 and 7 are each provided with return-flow grooves 14 and 15 which effect a return flow of leakage fluid in response to a corresponding direction of rotation of the shaft. In this context, the direction of return-flow grooves 14 and 15 is oriented in such a way that the return flow occurs when shaft 11 rotates in the main direction of rotation. At the same time, however, the seal also allows an altogether opposite direction of rotation. This is particularly the case when the sealing lips are equipped with a bidirectional helix according to an embodiment of the present invention. Sealing rings 4 and 5 are equipped with stiffening elements 16 and 17. These stiffening elements 16 and 17 have an L-shaped form and encompass the axially oriented upper portions 18 and 19, as well as radially oriented portions 20 and 21. Present at axial portions 18 and 19 are elastomer overlays 22 and 23, which are used as static seals when radial shaft seal 1 is inserted in a corresponding opening. Radial portions 20 and 21 of stiffening elements 16 and 17 are used as supports for sealing lips 6 and 7. In the exemplary embodiment of FIG. 1, they are designed to have different lengths. In the case of smaller sealing lip 7, limb 21 is longer than limb 20 in the case of larger sealing lip 6.

Bottom surfaces 8 and 9, which are fabricated of an elastomer material, are contiguous to limbs 20 and 21 of stiffening elements 16 and 17 that are oriented toward one another. This material is the same as the material used for static seal 22 and 23, as well as for sealing lips 6 and 7, so that, altogether, static seals 22 and 23, sealing lips 6 and 7, as well as bottom surfaces 8 and 9 are made of the same elastomer material. Sealing rings 4, 5 may then be produced in a curing process.

Figure 2:
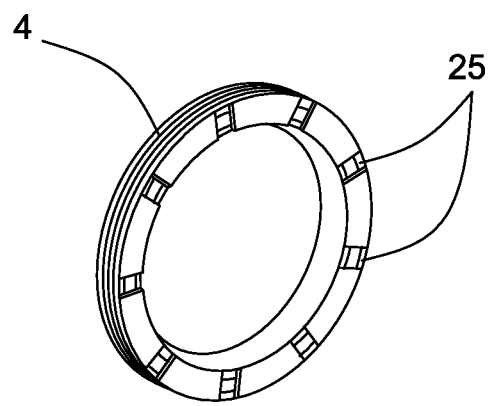
FIGS. 2 and 3 are perspective views of inner sides of the sealing rings according to an embodiment of the present invention.
Figure 3:
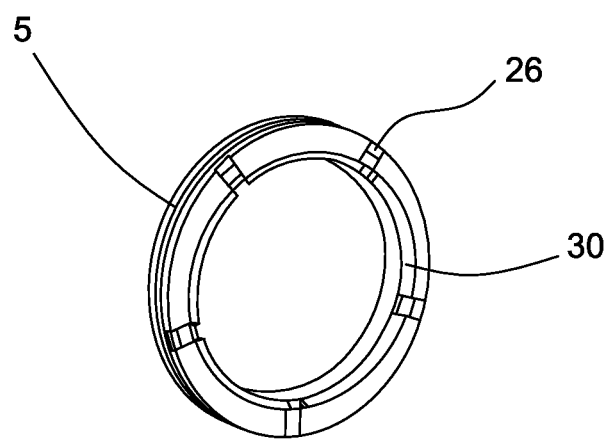

As is apparent from FIGS. 2 and 3, on bottom surfaces 8 and 9, sealing rings 4 and 5 have cut-outs 25 and 26 which are radially disposed in regular intervals over the circumference thereof, it being possible for an equal or different number of cut-outs 25 and 26 to be selected, depending on how many vents are to be configured. In the present case, sealing ring 4 has nine cut-outs 25, while sealing ring 5 has five cut-outs 26. In this context, it is beneficial when cut-outs 25, 26 have identical cross sections. To facilitate the process of assembling sealing rings 4 and 5 together, sealing ring 4 has inwardly projecting knobs 27 on the inner side thereof, at limb 18 of stiffening element 16, for purposes of assembly coding. In the sectional view of FIG. 1, two cut-outs 25 are disposed in mutual alignment, so that, in this case, vent opening 32 is present. In the present example, only one vent opening 32 is possible, since it is derived from the uneven number of cut-outs 25 and 26 of sealing rings 4 and 5.

Between cut-outs 26, radially inner rim 28 of sealing ring 5 is provided with clamping cams 30. These clamping cams 30 have a radially outwardly angled foot 31, which grips behind rim 29 on bottom 8 of sealing ring 4. In this manner, the two sealing rings 4 and 5 are joined to one another in a captive manner. At the same time, by appropriately adjusting sealing rings 4 and 5 relative to one another, at least one vent opening 32 is produced by cut-outs 25 and 26 in bottom surfaces 8 and 9 that connects space 10 between sealing lips 6 and 7 to a corresponding opening in the housing.

In the illustrated exemplary embodiment, two different sealing lips 6 and 7 have been selected that are adapted to the different pressures prevailing in spaces 2 and 3 to be sealed. The result is that stiffening elements 16 and 17 of different sizes were also used. In the case of smaller sealing lip 7, radial limb 21, in particular, is longer than limb 20 in the case of larger sealing lip 6. However, in one specific embodiment having two same sealing lips, an identical design of both sealing rings 4 and 5 is also possible, in that both sealing rings 4 and 5 are equipped in portions thereof with clamping cams 30 and, oppositely thereto, with corresponding rims 29. The stiffening elements are then equal in size.

While the invention has been particularly shown and described with reference to preferred embodiments thereof, it will be understood by those skilled in the art that various changes in form and details may be made therein without departing from the spirit and scope of the invention.

What is claimed is:
1. A radial shaft seal for separating two media comprising:
two radial shaft sealing rings each including a bottom surface and a sealing lip, the sealing rings being configured to be disposed on a shaft to be sealed with the bottom surfaces facing one another and the sealing lips axially opposed to one another with a space between the sealing lips including a vent, each of the sealing rings including a stiffening element, each of the bottom surfaces including cut-outs in a radial direction that are disposed in regular intervals about a circumference of each of the bottom surfaces,
wherein the bottom surface of one of the sealing rings differs from the bottom surface of the other sealing ring in that the bottom surface of the one of the sealing rings includes clamping cams configured to grip behind a radially inwardly protruding inner rim of the bottom surface of the other sealing ring so as to join the sealing rings in a form-locking, rear-engaging position relative to each other with the bottom surfaces of the sealing rings being in an abutting relationship and the space being ventilated by the cut-outs, and wherein the sealing lips include oppositely directed return flow grooves or a bidirectional helix so as to allow leakage fluid to be returned to the space between the sealing lips in response to a corresponding direction of rotation of the shaft.

2. The radial shaft seal according to claim 1, wherein the clamping cams and the inner rim include an elastomer material and are configured to engage one another via a snap-fit connection.

3. The radial shaft seal according to claim 2, wherein the inner rim of the other sealing ring and an axially contiguous portion of the sealing lip of the other sealing ring are configured to form an annular groove for the snap-fit connection with the clamping cams.

4. The radial shaft seal according to claim 2, wherein the clamping cams and the bottom surface of the one of the sealing rings are configured to form an annular groove for the snap-fit connection with the inner rim.

5. The radial shaft seal according to claim 2, wherein the sealing lips include the elastomer material.

6. The radial shaft seal according to claim 1, wherein the clamping cams are integrally joined with the sealing lip of the of the sealing rings.

7. The radial shaft seal according to claim 1, wherein the bottom surface of each of the sealing rings includes an elastomer material.

8. The radial shaft seal according to claim 1, wherein the cut-outs have identical cross sections.

9. The radial shaft seal according to claim 1, wherein one of the sealing rings includes twice as many cut-outs as the other sealing ring.

10. The radial shaft seal according to claim 1, wherein a quantity of the cut-outs on each of the sealing rings is different so that the cut-outs at least partially align when the sealing rings are in the form-locking, rear-engaging position.

11. The radial shaft seal according to claim 1, wherein the stiffening elements have an L-shaped form.

12. The radial shaft seal according to claim 1, wherein each of the sealing lips are configured to be pressed against the shaft by a helical spring.

13. The radial shaft seal according to claim 12, wherein an active plane of each of the sealing lips is positive in an uninstalled state.

14. The radial shaft seal according to claim 1, wherein each of the stiffening elements include an overlay formed from an elastomer material and configured as a static seal in an opening with a diameter corresponding to a radial position of each of the overlays.

* * * * *